United States Patent
O'Halloran

(10) Patent No.: US 10,218,845 B1
(45) Date of Patent: Feb. 26, 2019

(54) METHOD AND SYSTEM FOR CONNECTING USERS VIA A CALL TAGGING APPLICATION

(71) Applicant: Laurence R. O'Halloran, Arlington, VA (US)

(72) Inventor: Laurence R. O'Halloran, Arlington, VA (US)

( * ) Notice: Subject to any disclaimer, the term of this patent is extended or adjusted under 35 U.S.C. 154(b) by 116 days.

(21) Appl. No.: 15/082,345

(22) Filed: Mar. 28, 2016

(51) Int. Cl.
*H04M 3/42* (2006.01)

(52) U.S. Cl.
CPC ............... *H04M 3/42374* (2013.01)

(58) Field of Classification Search
None
See application file for complete search history.

(56) References Cited

U.S. PATENT DOCUMENTS

| | | | | |
|---|---|---|---|---|
| 2009/0287846 A1* | 11/2009 | Iyengar | ............... | G06F 15/173 709/242 |
| 2017/0195636 A1* | 7/2017 | Child | ............... | H04N 7/183 |
| 2017/0251260 A1* | 8/2017 | Sanders | ............... | H04N 21/4668 |
| 2017/0256257 A1* | 9/2017 | Froelich | ............... | G10L 15/02 |
| 2017/0295483 A1* | 10/2017 | Wang | ............... | H04W 4/90 |

* cited by examiner

*Primary Examiner* — Raj Jain
*Assistant Examiner* — Harry H Kim
(74) *Attorney, Agent, or Firm* — Hunton Andrews Kurth LLP

(57) ABSTRACT

An automated computer implemented method and system for connecting a user with another user comprises: receiving a request from a first user mobile device to connect with a second user mobile device for a communication event, wherein the request comprises a category, time estimate, subject matter of the request and a first user availability; identifying a recipient identifier corresponding to the second user mobile device; notifying the second user of the request for communication from the first user via a user interface on the second user mobile device; determining a second user availability for the second user mobile device; electronically communicating a connection opportunity for the first user and the second user; and connecting the first user and the second user to engage in the communication event based on the substantially matched availability in a manner that avoids phone tagging.

12 Claims, 9 Drawing Sheets

METHOD AND SYSTEM FOR CONNECTING USERS VIA A CALL TAGGING APPLICATION

FIELD OF THE INVENTION

The present invention generally relates to connecting multiple participants for a phone or video conversation in a manner that avoids the problems associated with phone tagging.

BACKGROUND OF THE INVENTION

Telephone tag is a vexing and persistent problem that interferes with proper and timely communication. It has an impact on business and social functions. It further impacts and slows down the velocity of business functions by delaying contacts between business associates.

These and other drawbacks exist.

SUMMARY OF THE INVENTION

Accordingly, one aspect of the invention is to address one or more of the drawbacks set forth above. According to an embodiment of the present invention, a communication system that connects a first user with a second user based on user availability, comprises: a processor; an interactive user interface coupled to the processor; and a memory comprising computer-readable instructions which when executed by the processor cause the processor to perform the steps comprising: receiving, via an electronic input, a request from a first user device to connect with a second user device for a communication event, wherein the request comprises a category, time estimate, subject matter of the request and a first user availability; identifying, via the processor, a recipient identifier corresponding to the second user device; notifying, via a communication network, the second user of the request for communication from the first user via an interface on the second user device; determining, via the processor, a second user availability for the second user mobile device; electronically communicating a connection opportunity for the first user and the second user when the first user availability and the second user availability are substantially matched; and connecting the first user and the second user to engage in the communication event based on the substantially matched availability in a manner that avoids phone tagging.

According to another embodiment of the present invention, a corresponding method of using the system described above is also realized.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention provides a platform for enabling a user to connect with one or more other callers. The present invention may be provided on a mobile device, including a cell phone, tablet, laptop, telephone as well as an online interface (e.g., via a computer processor, laptop, etc.).

An embodiment of the present invention is directed to a mobile phone-based system where a mobile phone user wishes to contact another mobile phone user to connect for a phone or video conversation. An embodiment of the present invention is directed to matching users to allow multiple individuals to connect at mutually convenient times.

Figure 1:
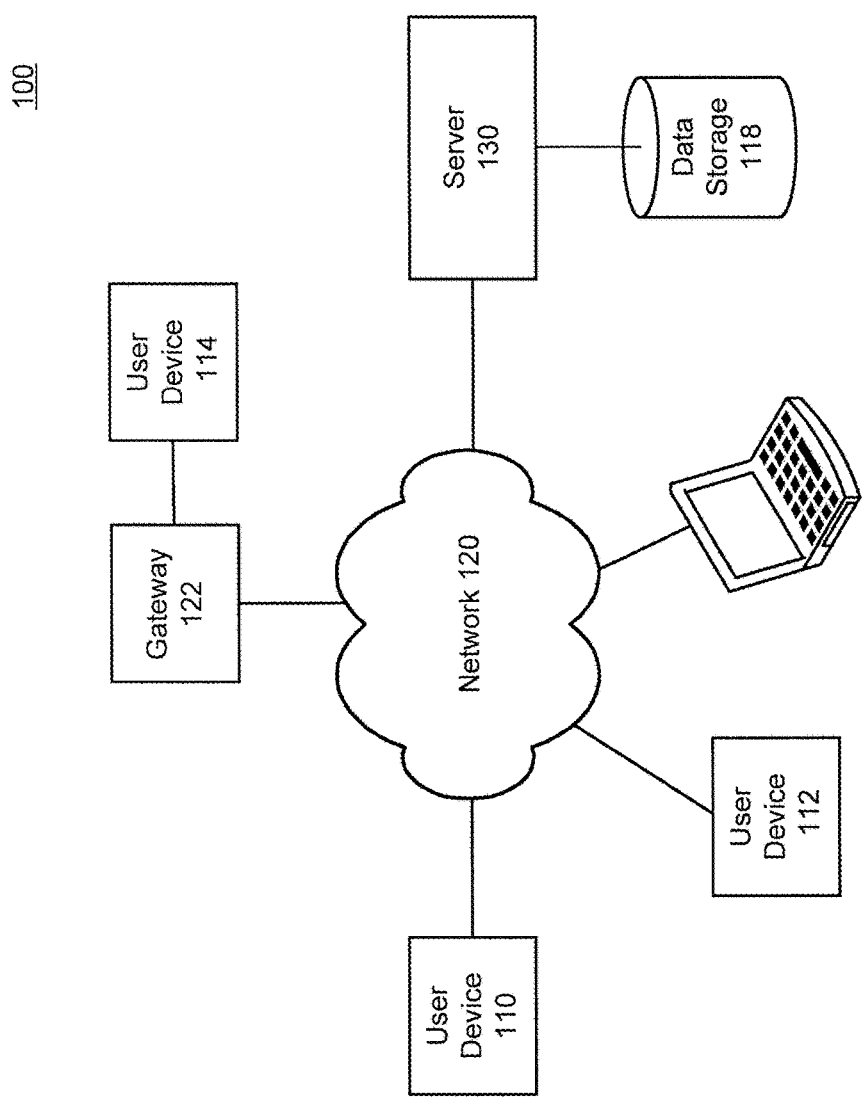
FIG. 1 is an exemplary diagram of a system for connecting callers, according to an embodiment of the present invention.

FIG. 1 is an exemplary diagram of a system for connecting callers, according to an embodiment of the present invention. System 100 may include user device 110 who wants to connect with one or more other user devices represented by user device 112. As shown in FIG. 1, a user device 110 may attempt to connect with user device 112. In this example, user device 110 may send a request to user device 112 through network 120, which may represent a telephone or cell network as well as other types of networks. User device 110 may also send a request to user device 114 through gateway 122. Server 130 may include various processing components to provide phone connecting services, with access to various forms of data, such as database 140. Server 130 may also access external sources of data. Although elements of system 100 may be described as a single device, it will be appreciated that multiple instances of these devices may be included in system 100, such as, for example, multiple user devices, multiple servers, multiple data storages, and multiple networks.

User device 110 may include a phone tagging application or feature. User device 112 may be, for example, but not limited to, a phone, a smartphone, a tablet computer, a head-mounted display, a cellular telephone, Session Initiation Protocol ("SIP") phone, software client/phone, a laptop/notebook, a server, a module, a satellite phone, a personal digital assistant ("PDA"), a handheld PC, a handheld MP3 player, a handheld video player, a personal media player, a gaming device, a thin system, a fat system, a network appliance, and/or other mobile communication device that may be capable of transmitting and/or receiving data. Also, user device 112 may include one or more transmitters, receivers, and/or transceivers to transmit and/or receive one or more signals to and/or from other components depicted in FIG. 1, including, for example, server 130.

Network 120 may be a wireless network, a wired network, or any combination of wireless network and wired network. Network 120 may utilize one or more protocols of one or more network elements to which it is communicatively coupled. Network 120 may translate to or from other protocols to one or more protocols of network devices. Although network 120 is depicted as one network, it should be appreciated that according to one or more embodiments, network 120 may comprise a plurality of interconnected networks, such as, for example, a service provider network, the Internet, a broadcaster's network, a cable television network, corporate networks, and home networks.

The components depicted in FIG. 1 may transmit and receive data to and from network 120 representing data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

Data storage 140 may be network accessible storage and may be local, remote, or a combination thereof to the components depicted in FIG. 1. Data storage 120 may be communicatively coupled to server 130, or to any other component depicted in FIG. 1. Any of the other components depicted in FIG. 1 may include one or more data storages as well.

An embodiment of the present invention may be implemented in various architectures. For example, user device, such as a mobile phone, may have the functionality downloaded via an application ("app") or other type of download. Also, the user device may have the functionality built-in to the device itself or preloaded. The user device may access a website, a server, a gateway and/or other intermediary to activate the functionality. Other methodologies may be implemented. In the example of the phone app, the phone app may access a mobile phone's contacts database. The user may select one or more contacts (or group of contacts) with which the user would like to have a phone conversation. The user may also input a new contact. The user may then identify specifics for the intended call, which may include a category (e.g., routine, urgent, response, business, school, work, family, etc.), estimate of time needed (e.g., 1 minute, 5 minutes, 30 minutes, etc.), subject matter (e.g., short description of what the conversation is about, etc.), indication of availability (e.g., checkbox of days/time, etc.), indication of immediate availability (e.g., available now, available at 3:00 pm, available in 10 minutes, etc.) and/or other information. Other data may be sent, e.g., image, video, attachment, file, link, etc.

Figure 2:
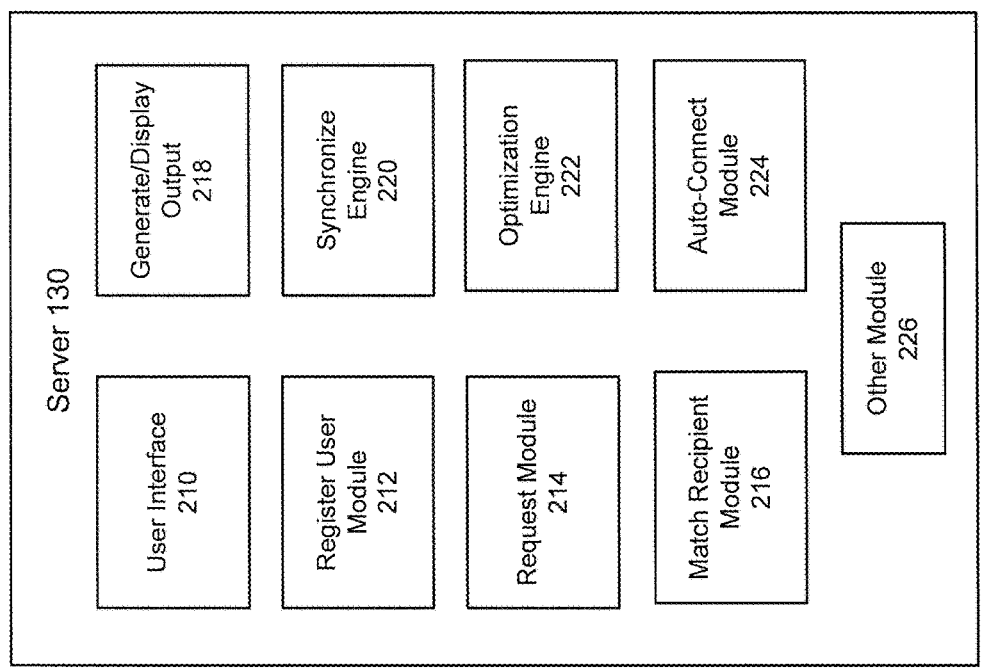
FIG. 2 is a detailed diagram of a server, according to an exemplary embodiment of the present invention.

FIG. 2 is a detailed diagram of a server, according to an exemplary embodiment of the present invention. Server 130 may include various processors, modules and interfaces for performing various call related and other processing functionality. In this exemplary embodiment, Server 130 may include User Interface 210, Register User Module 212, Request Module 214, Match Recipient Module 216, Generate/Display Output 218, Synchronization Engine 220, Optimization Engine 222, Auto-Connect Module 224 and/or other modules, interfaces and/or processors, as represented by Other Module 226. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

For example, the functionality illustrated with Server 130 may be provided via a network at a remote system. Also, some or all of the functionality may reside on a user device, and/or other network component.

As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

User Interface 210 may provide a user-friendly interface. The information displayed may be customized for the user. User preferences may be user defined and/or automatically applied. Also, the User Interface 210 may be provided on a mobile device, phone, laptop and/or other communicating device. According to another embodiment of the present invention, Server 130 may host a website or other electronic interface or other input where users can access data as well as provide data.

Register User Module 212 may register or otherwise identify users for the phone tagging application or service. An embodiment of the present invention may request a user to register with the service. According to another example, users may be automatically identified or registered. For example, in an embodiment where the service is part of the mobile device or phone, a registration process may not be invoked. If the recipient user is a registered user, a notification may be sent to the one or more intended recipients cell phone notifying that a new request has been received. The recipient may then view the request.

Request Module 214 may generate and/or receive requests from users desiring to connect with another user using the phone tagging application or service. The request may be received from a user on a mobile device, phone, and/or other device with communication capabilities. The request may be intended for one or more other users. The request may include information, such as category of the communication, subject matter, expected duration, etc. The request may also include an image, icon, animation, video, files, etc. that conveys details of the request. The request may further include a color code and/or other type of icon that conveys the type of communication desired by the user.

Match Recipient Module 216 may perform a matching process that identifies a desired recipient. According to an exemplary embodiment, the request may be packaged as a HTTP payload and transmitted over a network to a central server. The central server may then match a recipient with its list of user (e.g., registered or other users). The match may be performed via a phone number matching. Other identifiers or aliases may be used for matching. If the recipient user is not a registered user then a message (e.g., text message, email, voicemail, voice message, etc.) may be sent to the recipient user advising the user of the request and inviting the user to download the app (or access the service). For example, a user may also invoke a call-forwarding feature that enables a call request to one number to be forwarded to a more convenient number. Also, a user may be associated with multiple phone numbers (e.g., personal mobile device, work mobile device, etc.). An embodiment of the present invention may identify a best or optimal number for that particular user, e.g., the work phone may be contacted during work days and a personal phone may be contacted during evenings and weekends.

Generate/Display Output 218 provides an output for the recipient. Based on the information conveyed by the request, an embodiment of the present invention may then generate an output for display on the intended recipient's device. The recipient's device may be a phone, mobile device, processor, computer, and/or other device with communication functionality. For example, a call request may be received on a phone with a screen, computer, laptop, and/or other computing devices. The display may provide a list of requested communications from one or more users. The requested communications may be prioritized and/or sorted by various factors, such as importance, time to call, shortest expected duration, etc. The output may also include an option to connect with the requesting user.

Sync Engine 220 may provide the ability to synchronize the call requests with another application or program associated with the recipient and/or user. For example, a user's calendar functionality may be synchronized with the call tagging application. In this example, an embodiment of the present invention may access a user's calendar that indicates when the user is available or not available. A user's schedule may then be used to automatically identify a user's availability and/or optimal time periods to other requesting users.

Optimization Engine 222 may identify an optimal time to connect based on each user's respective schedule. The schedule may be obtained from the user device's calendar functionality or other data source. Other inputs may also be considered.

Auto-Connect Module 224 may automatically connect (e.g., dial) the requesting user and the intended recipient the next time both (some or all) parties are available. This function may be provided for select users, such as a spouse, child, parent. If a particular time period or time is preferred, set or agreed upon, an embodiment of the present invention may automatically connect (e.g., dial) each party at that time. If one party answers, an embodiment of the present invention may inform the waiting party that the other party is in the process of being contacted. Also, an embodiment of the present invention may place an answering party on hold until the other party is connected. Other variations may be implemented.

Figure 3:
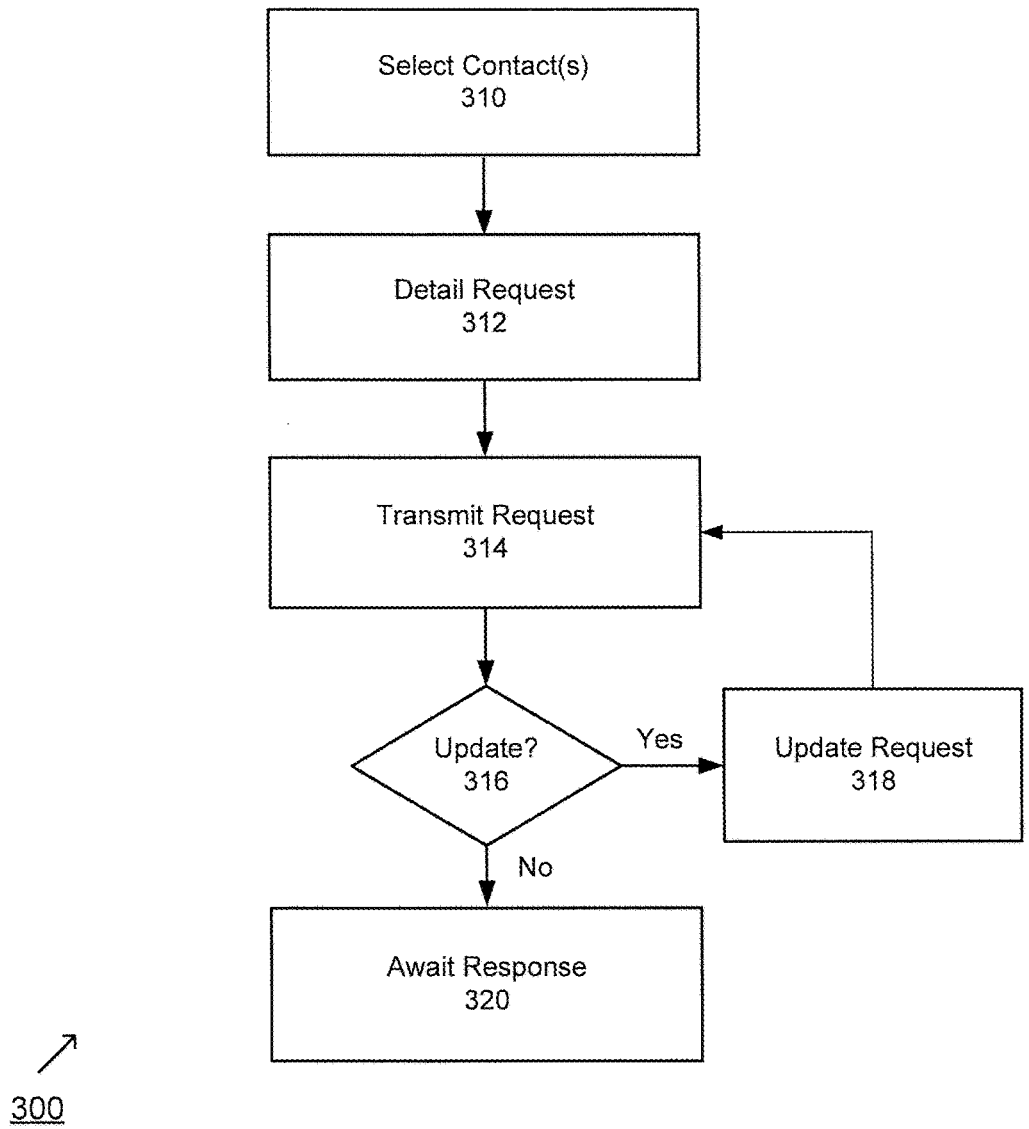
FIG. 3 is an exemplary diagram of a flowchart for requesting a communication, according to an embodiment of the present invention.

FIG. 3 is an exemplary diagram of a flowchart for requesting a communication, according to an embodiment of the present invention. A user may desire to send a request for a phone conversation to a recipient. At step 310, the user may select one or more contacts. At step 312, the user may provide details for the request. At step 314, the user may transmit the request intended for the recipient. At step 316, an embodiment of the present invention may determine whether an update should be sent. If yes, an embodiment of the present invention may provide an update to the request at step 318. If not, the user may then await a response from the recipient at step 316. If the recipient is available, a call may be initiated. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

At step 310, the user may select one or more contacts. For example, a user may desire to connect with one or more contacts via a phone conversation, video communication or other forms of communication. The call may be to another user or to set up a conference call with multiple users. The contacts may be from a user's mobile or other device or source. Also, the user may enter a phone number or other identifier associated with another communication device.

At step 312, the user may provide details for the request. The request may include information that informs the intended recipient about the call and the relative urgency. The recipient may also classify calls from certain individuals or subject matters of interest that may receive higher priority to the recipient. For example, a category for "family" may be identified that quickly alerts the recipient about the call. Users of an embodiment of the present invention may also customize categories. For example, a user may be awaiting information on a business deal so that any category that corresponds to "business" or "book deal" may be easily identified as an important call. Also, a user may specify that any call from a particular user or phone number may be designed as an urgent or priority call. For example, any calls from a user's child's elementary school may be deemed important.

At step 314, the user may transmit the request intended for the recipient. The request may be transmitted from the user's device. The request may be formatted and then sent to a server for matching and/or further processing. The request may also be sent directly to another device via a peer-to-peer system.

At step 316, an embodiment of the present invention may determine whether an update should be sent. If yes, an embodiment of the present invention may provide an update to the request at step 318. If not, the user may then await a response from the recipient at step 316. If the recipient is available, a call may be initiated. According to an embodiment of the present invention, one or more updates to call requests may be sent to a central server and forwarded to one or more recipients. Updates to a transmitted request may include changing the users availability status for a request or changes in the request details such as time needed, urgency, days available and description. Other updates and/or other data may be transmitted.

Figure 4:
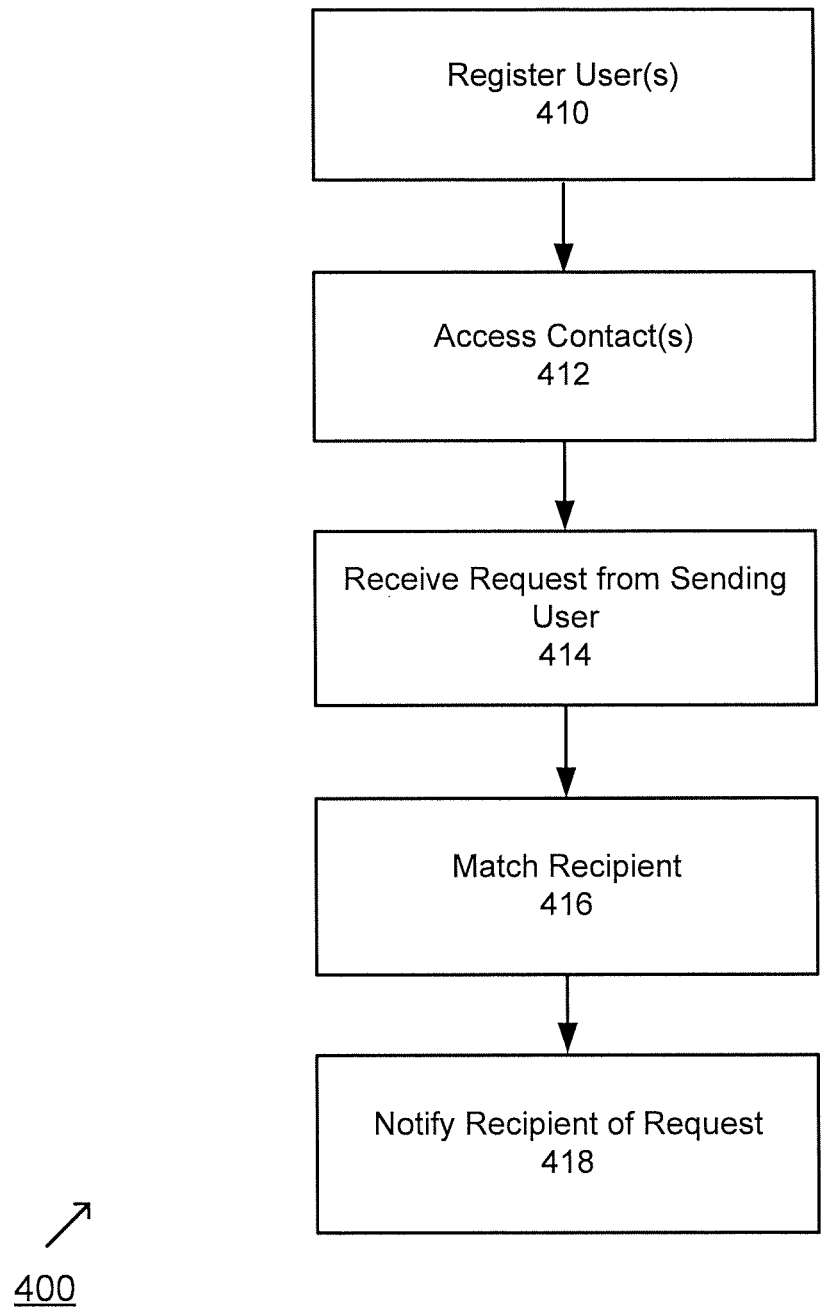
FIG. 4 is an exemplary diagram of a flowchart for receiving a call request and identifying a recipient, according to an embodiment of the present invention.

FIG. 4 is an exemplary diagram of a flowchart for receiving a call request and identifying a recipient, according to an embodiment of the present invention. An embodiment of the present invention may be implemented by a remote server. Other architectures and designs may be realized. At step 410, an embodiment of the present invention may register users for this service. Also, the service may be a function that resides on the mobile device itself. At step 412, contacts associated with the user device may be accessed. At step 414, a request may be received from a user device. At step 416, a recipient may be matched with a recipient. At step 418, the recipient may be notified of the request. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

At step 410, an embodiment of the present invention may register users for this service. Also, the service may be a function that resides on the mobile device itself. The user may register prior to invoking the service. Also, a user may also register for the system when the user receives a call request.

At step 412, contacts associated with the user device may be accessed. An embodiment of the present invention may access contacts from the user's device. Also, other sources of contact information may be retrieved, such as from a remote or other database. A user who is part of a larger company, may be associated with contacts from the company's database.

At step 414, a request may be received from a user device. The request from a user may be a request to connect with another user or group of users. The request may include specifics, such as category of request, indication of urgency, estimated time, subject matter, availability, etc.

At step 416, a recipient may be matched. An embodiment of the present invention may retrieve a phone number or other identifier from the request and match that phone number with numbers in a database or other source. If a number is not found, an embodiment of the present invention may send the request to a new number, the request may include an invitation to register for the service or an invitation to activate the service.

At step 418, a recipient may be notified of the request. The recipient may be receive the request and determine whether to initiate a call, respond with additional information or ignore the request. The recipient may also send an automatic response to the user. For example, if the recipient is in an all-day meeting with no ability to return a phone call, an automatic message may be conveyed to some or all requesting users.

Figure 5:
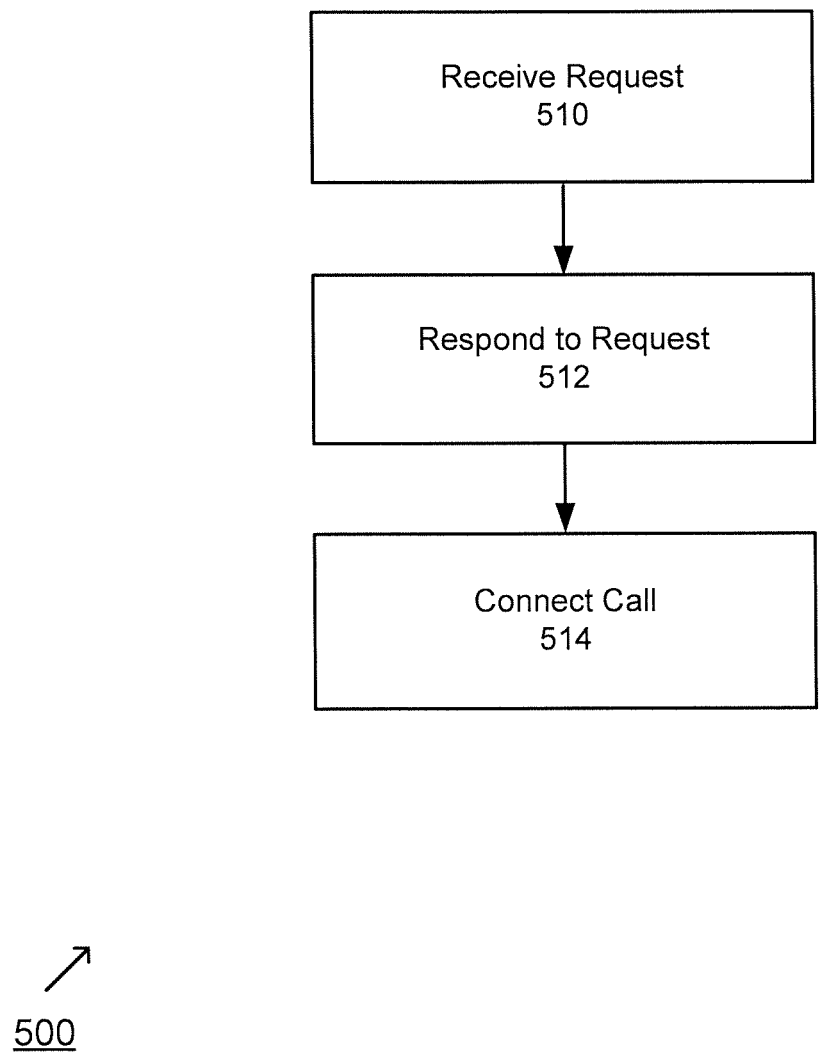
FIG. 5 is an exemplary diagram of a flowchart for receiving a call request, according to an embodiment of the present invention.

FIG. 5 is an exemplary diagram of a flowchart for receiving a call request, according to an embodiment of the present invention. At step 510, a recipient may receive a request from a user. At step 512, the recipient may respond to the request. At step 514, the recipient may connect with the user. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

At step 510, a recipient may receive a request from a user. An intended recipient may receive one or more requests from one or more users desiring to connect with the recipient. The requests may be listed for the recipient. The requests may be categorized or sorted by topic, urgency, time requested, etc.

At step 512, the recipient may respond to the request. The recipient may respond based on the recipient's availability. If some or all of the parties are available, the recipient may connect with the user at step 514.

Figure 6:
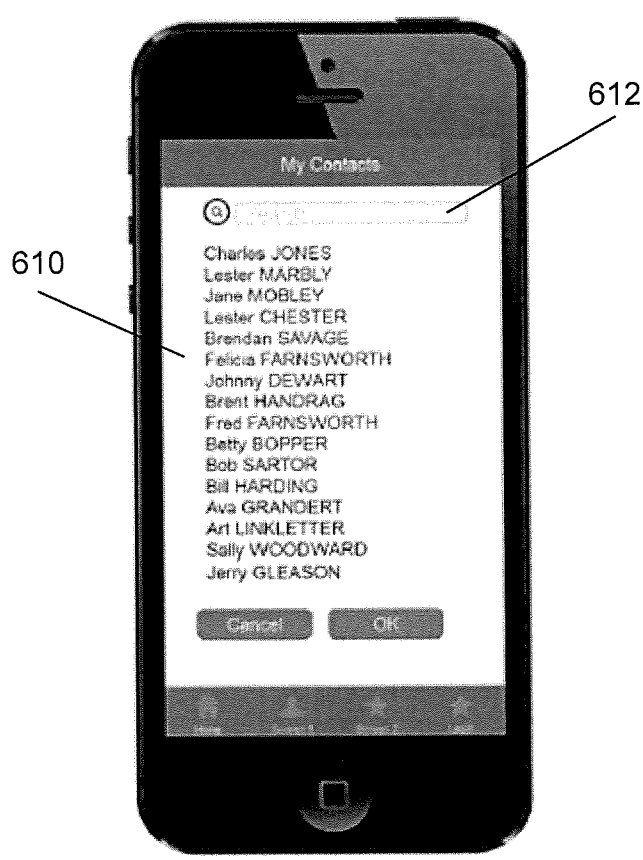
FIG. 6 illustrates an exemplary interface, according to an embodiment of the present invention.

FIG. 6 illustrates an exemplary interface, according to an embodiment of the present invention. FIG. 6 illustrates a contact list 610 from a user's phone that may be accessed by an embodiment of the present invention. From the list, the user may select one or more intended recipients. Also, the user may search for a particular recipient at 612. The user may also identify a group that comprises a plurality of users. FIG. 6 is shown on a mobile device, however, the application may be provided on various types of devices, including phones, processors, computers, etc.

Figure 7:
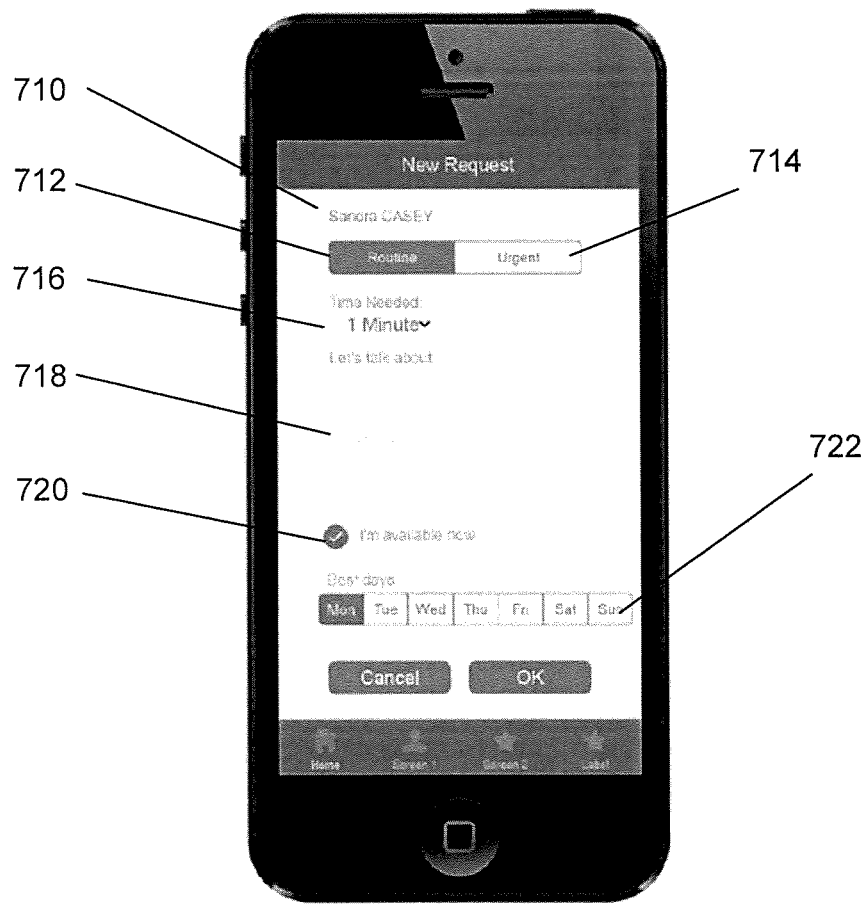
FIG. 7 illustrates an exemplary interface, according to an embodiment of the present invention.

FIG. 7 illustrates an exemplary interface, according to an embodiment of the present invention. FIG. 7 illustrates a new request interface where a user desires to connect with a recipient. The interface may display one or more requests. For example, one interface/screen may be used for each request. Each interface may illustrate a recipient name and details of the request. As shown in FIG. 7, a user may wish to send a new request to a recipient. In this example, the new request may be sent to S. Casey as shown by 710. The user may identify a category. In the example shown in FIG. 7, the category may be identified as routine 712 or urgent 714. Other categories may be specified, such as family, school, work, etc. The user may also identify time needed at 716. In this example, the time needed is 1 minute. Other time specifics may include 5 minutes, 10 minutes, 30 minutes, etc. The time periods may selected from a drop down window. The user may identify a subject matter in the "Let's talk about" window 718. The user may also indicate that the user is currently available now at 720. The user may also specify that the user is available for a time period at 722. For example, the user may indicate that the user is available now "until the next 30 minutes", "until 4:00 pm," etc. The user may also specify the preferred or best days of availability by selecting one or more best days. The user may also identify preferred time periods for the best days. The user may select okay to transmit the request.

Figure 8:
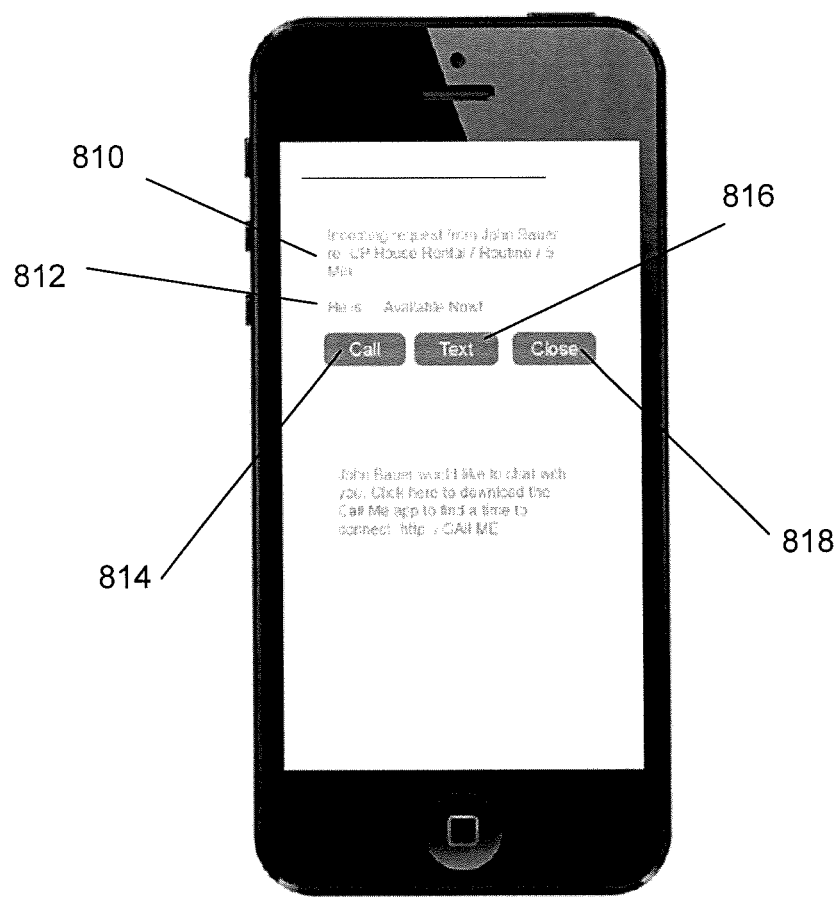
FIG. 8 illustrates an exemplary interface, according to an embodiment of the present invention.

FIG. 8 illustrates an exemplary interface, according to an embodiment of the present invention. FIG. 8 illustrates an alert that a new request is incoming as shown by 810. In this example, an incoming message indicates sender, subject matter, category, and time estimate. The message indicates further that the sender is available now at 812. The recipient may then choose to respond. The recipient may respond by calling at 814, texting at 816 or closing the message 818. Other options may also be available. The recipient may also respond by asking to be reminded later (in 5 minutes, etc.). The recipient may also request an auto response in 30 minutes where the recipient's device automatically dials back the sender in 30 minutes. The recipient may also dial back at a set time. Other response options may be available. If the recipient is not registered with the service, a message may be provided that instructs the recipient how to register with the service.

Figure 9:
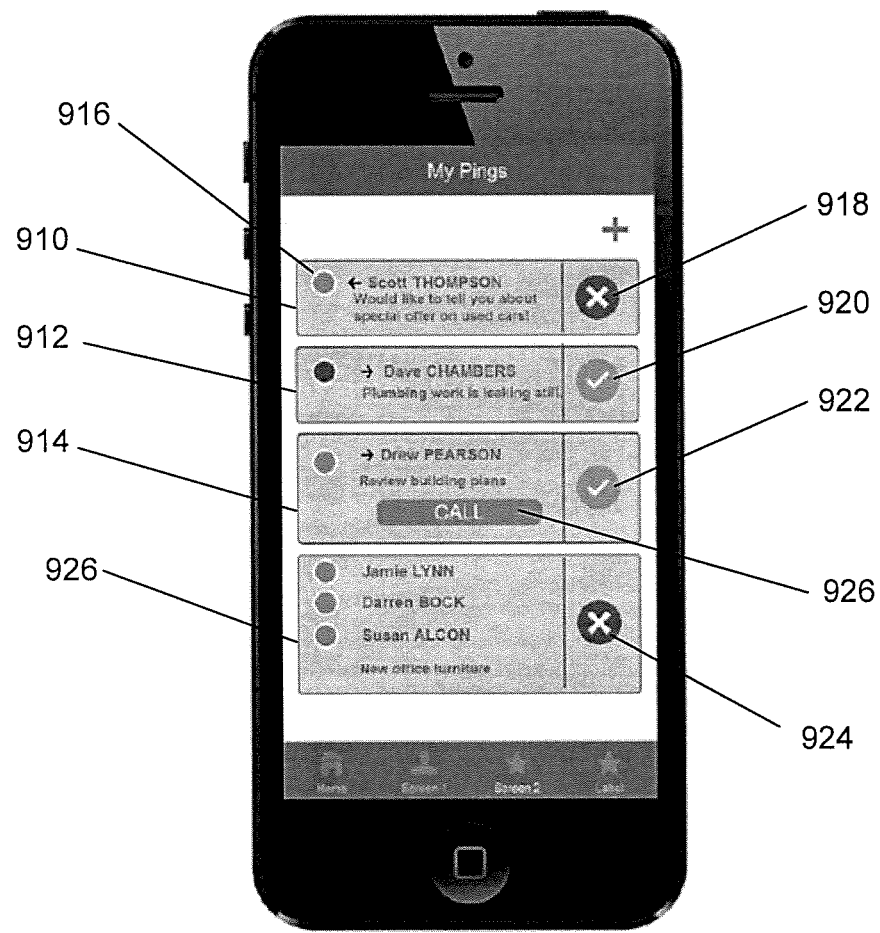
FIG. 9 illustrates an exemplary interface, according to an embodiment of the present invention.

FIG. 9 illustrates an exemplary interface, according to an embodiment of the present invention. FIG. 9 is an exemplary illustration, other features and functionality may be provided. FIG. 9 displays requests from multiple users desiring to connect with a particular recipient. In this example, there are three pending requests for a recipient at 910, 912, 914. Request 928 is a request for a conference call with three other participants. The interface may indicate whether the recipient is available or not available as shown by 916 for request 910, and if not available, when the user will be available. Also, the interface may include icons, such as a check box 918, 920, 922 and 926, that illustrate whether the user is available or not available for the particular request. The user may select a different availability status for each request. For instance, the user may be available for one request but not available for another request. Additional details regarding the user's availability to connect may be provided. For example, the user may indicate when the user will be available, e.g., available in 10 minutes, available at 6:00 pm, available during lunch.

When the interface shows that the target person is available and that the user has checked their available status as available, a call button 926 may appear within the panel. The user may then initiate call with that recipient by initiating the call button.

An embodiment of the present invention is directed to matching a user's availability with a recipient's availability such that when a first user is available to a second user, they are both individually able to initiate a phone call in either direction knowing that the other user is available to receive their particular phone call.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A communication system that connects a first mobile phone user with a second mobile phone user based on user availability to avoid phone tagging, comprising:
    a central processor;
    an interactive user interface coupled to the central processor; and
    a memory, coupled to the interactive user interface and central processor, the memory comprising computer-readable instructions which when executed by the central processor cause the central processor to perform the steps comprising:
    receiving, via an electronic input, a request from a first mobile phone to connect with a second mobile phone for a communication event, wherein the request comprises a category comprising an indication of a routine communication or an emergency communication, a time estimate that represents an estimated duration of the communication event between the first user and the second user, a subject matter of the request to communicate that indicates a reason for the communication event and a first user availability to communicate with the second user;
    identifying, via the central processor, a recipient identifier corresponding to the second mobile phone;
    notifying, via a communication network, the second user of the request for communication from the first user via an user interface on the second mobile phone;
    determining, via the central processor, a second user availability to communicate with the first user via the second mobile phone, wherein the second user availability is based at least in part on the time estimate;
    electronically communicating, via the interactive user interface, a connection opportunity for the first user and the second user when the first user availability and the second user availability are substantially matched; and automatically connecting the first user and the second user to engage in the communication event directly responsive to the substantially matched availability in a manner that avoids phone tagging without requiring the first user and the second user to initiate a call;

wherein the first user and the second user are human users.

2. The system of claim 1, wherein the central processor is further configured to perform the additional step of:

accessing one or more contacts from the first mobile phone.

3. The system of claim 1, wherein the connection opportunity comprises a phone call and a text message.

4. The system of claim 1, wherein the request further comprises multiple other users.

5. The system of claim 1, wherein the first user availability is determined by accessing a calendar application on the first mobile phone.

6. The system of claim 1, wherein the second user availability is determined by accessing a calendar application on the second mobile phone.

7. The mobile device of claim 1, wherein the connection opportunity comprises a phone call and a text message.

8. The mobile device of claim 1, wherein the request further comprises multiple other users.

9. The mobile device of claim 1, wherein the first user availability is determined by accessing a calendar application on the first mobile phone.

10. The mobile device of claim 1, wherein the second user availability is determined by accessing a calendar application on the second mobile phone.

11. An automated computer implemented method for connecting a user with another user, wherein the method is executed by a programmed computer processor which communicates with a user via a network, the method comprising the steps of:

receiving, using a programmed computer processor, a request from a first user mobile device to connect with a second user mobile device for a communication event, wherein the request comprises a category comprising an indication of a routine communication or an emergency communication, a time estimate that represents an estimated duration of the communication event between the first user and the second user, a subject matter of the request to communicate that indicates a reason for the communication event and a first user availability to communicate with the second user;

identifying, using the programmed computer processor, a recipient identifier corresponding to the second user mobile device;

notifying, using the programmed computer processor, the second user of the request for communication from the first user via a user interface on the second user mobile device;

determining, using the programmed computer processor, a second user availability to communicate with the first user via the second user mobile device, wherein the second user availability is based at least in part on the time estimate;

electronically communicating, via the interactive user interface, a connection opportunity for the first user and the second user when the first user availability and the second user availability are substantially matched; and automatically connecting the first user and the second user to engage in the communication event directly responsive to the substantially matched availability in a manner that avoids phone tagging without requiring the first user and the second user to initiate a call; wherein the first user and the second user are human users.

12. A mobile device that connects a first mobile phone user with a second mobile phone user based on user availability, comprising:

a processor;

an interactive user interface coupled to the processor; and a memory comprising computer-readable instructions which when executed by the processor cause the processor to perform the steps comprising:

sending, via the mobile device associated with a first user, a request to connect with a second user device for a communication event, wherein the request comprises a category comprising an indication of a routine communication or an emergency communication, a time estimate that represents an estimated duration of for the communication event between the first user and the second user, a subject matter of the request to communicate that indicates a reason for the communication event and a first user availability to communicate with the second user;

identifying, via the processor, a recipient identifier corresponding to the second mobile phone;

notifying, via a communication network, the second user of the request for communication from the first user via an interface on the second mobile phone;

electronically communicating a connection opportunity for the first user and the second user when the first user availability and a second user availability are substantially matched; and connecting, via a communication network, with the second user to engage in the communication event based on the substantially matched availability in a manner that avoids phone tagging without requiring the first user and the second user to initiate a call;

wherein the first user and the second user are human users.

* * * * *